United States Patent
Noya et al.

(10) Patent No.: US 8,055,139 B2
(45) Date of Patent: Nov. 8, 2011

(54) LIGHT RECEIVER

(75) Inventors: Munetaka Noya, Kanagawa (JP);
Koichi Iguchi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 1197 days.

(21) Appl. No.: 11/580,839

(22) Filed: Oct. 16, 2006

(65) Prior Publication Data

US 2007/0086791 A1     Apr. 19, 2007

(30) Foreign Application Priority Data

Oct. 17, 2005   (JP) ................................. 2005-301748

(51) Int. Cl.
*H04B 10/06* (2006.01)
*H01J 40/14* (2006.01)

(52) U.S. Cl. .................. 398/210; 398/202; 369/124.11; 369/124.12

(58) Field of Classification Search ........... 398/202–214
See application file for complete search history.

(56) References Cited

U.S. PATENT DOCUMENTS

| | | | | |
|---|---|---|---|---|
| 3,605,082 A | * | 9/1971 | Matthews | 340/556 |
| 3,646,466 A | * | 2/1972 | Crowe et al. | 330/287 |
| 3,772,517 A | * | 11/1973 | Smith | 250/208.2 |
| 3,781,693 A | * | 12/1973 | Ford | 327/350 |
| 3,789,952 A | * | 2/1974 | Widegren et al. | 73/645 |
| 4,141,008 A | * | 2/1979 | McMaster | 340/533 |
| 4,210,826 A | * | 7/1980 | Baker | 327/412 |
| 4,591,710 A | * | 5/1986 | Komadina et al. | 250/221 |
| 4,659,939 A | * | 4/1987 | Lorenzo | 250/566 |
| 4,713,620 A | * | 12/1987 | Hallford et al. | 327/361 |
| 4,805,236 A | * | 2/1989 | Urala | 398/202 |
| 4,956,587 A | * | 9/1990 | Kitou et al. | 315/408 |
| 5,140,573 A | * | 8/1992 | Ando | 369/44.28 |
| 5,202,553 A | * | 4/1993 | Geller | 250/214 A |
| 5,239,402 A | * | 8/1993 | Little et al. | 398/202 |
| 5,254,851 A | * | 10/1993 | Yamakawa et al. | 250/214 A |
| 5,311,353 A | * | 5/1994 | Crawford | 359/333 |
| 5,347,388 A | * | 9/1994 | Little et al. | 398/202 |
| 5,347,389 A | * | 9/1994 | Skrobko | 398/202 |
| 5,477,370 A | * | 12/1995 | Little et al. | 398/202 |
| 5,589,682 A | * | 12/1996 | Brown et al. | 250/214 A |
| 5,731,692 A | * | 3/1998 | Garcia | 323/274 |
| 5,900,960 A | * | 5/1999 | Reime | 398/202 |

(Continued)

FOREIGN PATENT DOCUMENTS

JP       2003-022537       1/2003

(Continued)

OTHER PUBLICATIONS

Diefenderfer "Principles of electronic instrumentation" (1979), pp. 110-135, 242-244.*

(Continued)

*Primary Examiner* — Danny Leung
(74) *Attorney, Agent, or Firm* — McGinn Intellectual Property Law Group, PLLC (57) ABSTRACT

There is provided a light receiver including a photodiode converting an optical signal into an electrical signal, and a plurality of amplifiers respectively having different gains, each input end of the plurality of amplifiers being connected to one end of the photodiode, and one of the plurality of amplifiers being in operating state for outputting an output signal. At least one of the plurality of amplifiers and the photodiode are connected through a diode.

22 Claims, 6 Drawing Sheets

U.S. PATENT DOCUMENTS

| | | | |
|---|---|---|---|
| 6,188,494 B1* | 2/2001 | Minteer | 398/135 |
| 6,208,446 B1* | 3/2001 | Faifman | 398/136 |
| 6,292,052 B1* | 9/2001 | Carlson | 330/9 |
| 6,362,911 B1* | 3/2002 | Lee et al. | 398/208 |
| 6,449,078 B1* | 9/2002 | Hirotsune | 398/202 |
| 6,465,967 B2* | 10/2002 | Tsujikawa et al. | 315/169.1 |
| 6,477,131 B1* | 11/2002 | Tsuchinaga et al. | 369/124.12 |
| 6,515,459 B1* | 2/2003 | Ottinger et al. | 323/269 |
| 6,580,530 B1* | 6/2003 | Arecco et al. | 398/5 |
| 6,583,400 B2* | 6/2003 | Miyoshi | 250/214 A |
| 6,606,174 B1* | 8/2003 | Ishikawa et al. | 398/135 |
| 6,609,842 B1* | 8/2003 | Kimbrough | 398/195 |
| 6,707,025 B2* | 3/2004 | Azary et al. | 250/214 AG |
| 6,724,793 B2* | 4/2004 | Nagara | 372/38.02 |
| 6,847,743 B2* | 1/2005 | Yamaguchi | 385/11 |
| 7,034,327 B2* | 4/2006 | Fucile | 250/573 |
| 7,035,195 B2* | 4/2006 | Nagara | 369/116 |
| 7,092,644 B2* | 8/2006 | Davidson | 398/202 |
| 7,167,655 B2* | 1/2007 | Olivier | 398/202 |
| 7,242,871 B2* | 7/2007 | Huang et al. | 398/210 |
| 7,257,323 B2* | 8/2007 | Noguchi et al. | 398/24 |
| 7,343,103 B2* | 3/2008 | Seong et al. | 398/202 |
| 7,359,414 B2* | 4/2008 | Ikeda et al. | 372/38.07 |
| 7,509,055 B2* | 3/2009 | Tomofuji et al. | 398/160 |
| 2002/0126952 A1* | 9/2002 | Shirai | 385/24 |
| 2003/0001534 A1* | 1/2003 | Kock et al. | 318/466 |
| 2004/0052537 A1* | 3/2004 | Kamali et al. | 398/202 |
| 2004/0184387 A1 | 9/2004 | Shirasaka et al. | |
| 2004/0247327 A1* | 12/2004 | Kamali et al. | 398/202 |
| 2005/0220459 A1* | 10/2005 | Schrodinger | 398/202 |
| 2005/0254828 A1* | 11/2005 | Brekelmans et al. | 398/202 |
| 2007/0086791 A1* | 4/2007 | Noya et al. | 398/202 |
| 2008/0056732 A1* | 3/2008 | Nishimura et al. | 398/202 |
| 2008/0075473 A1* | 3/2008 | Iguchi | 398/202 |
| 2008/0240735 A1* | 10/2008 | Bossard | 398/202 |

FOREIGN PATENT DOCUMENTS

| | | |
|---|---|---|
| JP | 2004-235764 A | 8/2004 |
| JP | 2005-032282 | 2/2005 |

OTHER PUBLICATIONS

Japanese Office Action dated Feb. 23, 2010 with partial English-language translation.

* cited by examiner

LIGHT RECEIVER

BACKGROUND OF THE INVENTION

1. Field of the Invention

The present invention relates to a light receiver which is used for an optical pickup and has a photodiode as an input source and, particularly, to a light receiver with gain switching function.

2. Description of Related Art

An optical pickup is a device for reading and writing data on optical disks such as CD and DVD. The optical pickup typically includes a light receiver which receives reflected light from an optical disk as an optical signal by a photodiode, amplifies an electrical signal generated based on the optical signal and outputs the electrical signal.

Recently, highly functional light receivers are required so as to ensure application to optical pickups with multi-compatibility feature (e.g. CD-ROM, DVD-ROM, DVD-R, DVD-RAM, BD(Blu-ray disk)-ROM). In an optical pickup with multi-compatibility, a light receiver receives optical signals of different intensity levels, such as optical signals for writing/reading, optical signals with different wavelengths, and so on. Still, the light receiver needs to provide an output signal of a constant intensity level.

An optical pickup with multi-compatibility to receive optical signals with different wavelengths and different intensity levels can include a plurality of light receivers with different gains. However, this requires an optical system for inputting an optical signal to each light receiver and thus complicates the optical system of the optical pickup. Further, this hinders the miniaturization of the optical pickup. In addition, preparing a plurality of light receivers results in an increase in the number of components, which increases manufacturing costs.

To address the above drawback, an optical pickup can include a single photodiode and a plurality of amplifiers which have different gains as usage and are connected to the photodiode, so that one amplifier can be selected and activated according to need.

Figure 3:
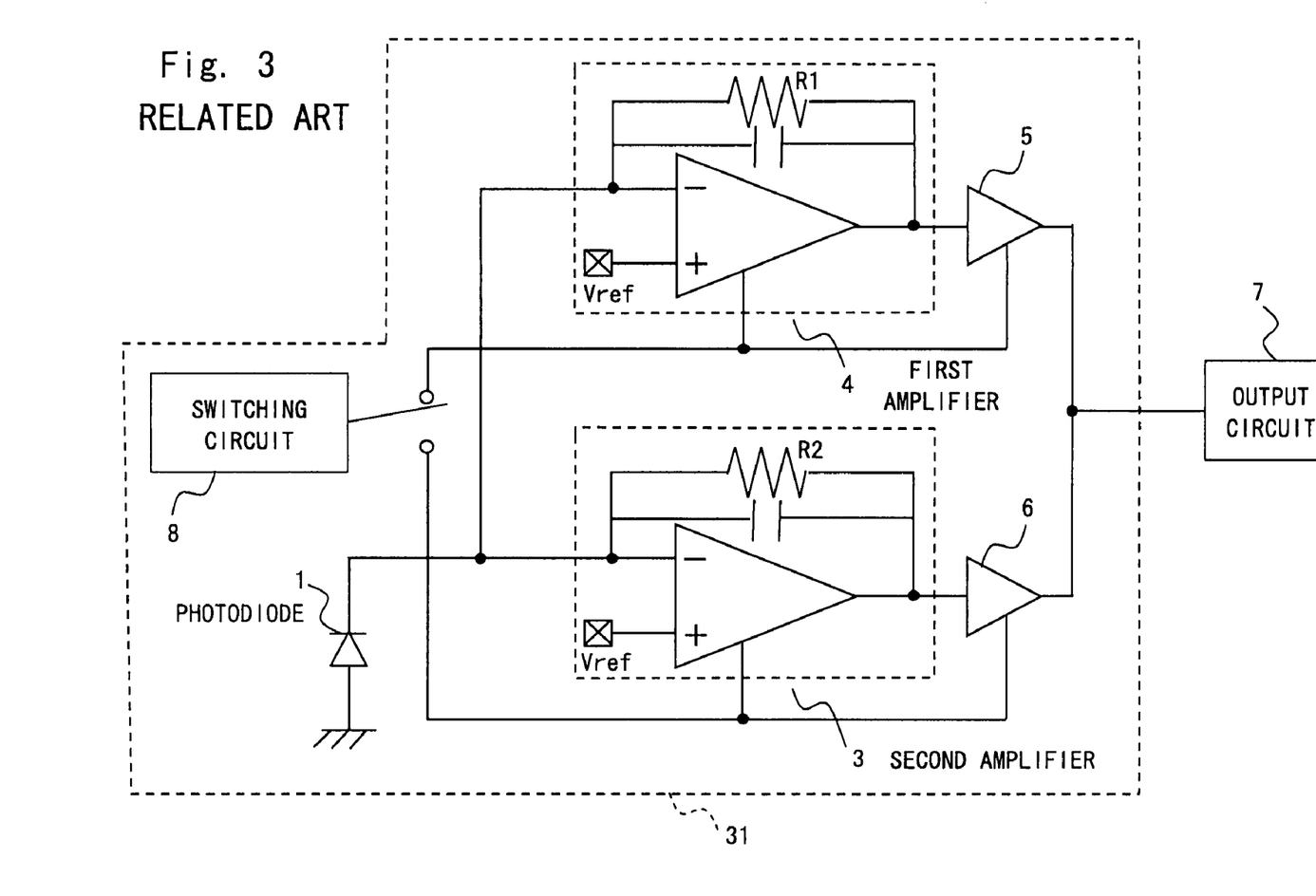
FIG. 3 is a circuit diagram according to a related art.

FIG. 3 is a circuit diagram of a light receiver 31 with multi-compatibility according to a related art. A cathode of a photodiode 1 which serves as an input signal source is connected to an input end of a first amplifier 4 and an input end of a second amplifier 3. The first amplifier 4 and the second amplifier 3 are negative-feedback amplifiers which have resistors R1 and R2, respectively, between the input and output. Outputs of the first amplifier 4 and the second amplifier 3 are input to an output circuit 7 through buffers 5 and 6, respectively. The light receiver 31 also includes a switching circuit 8 which switches to cause one of the first amplifier 4 and the second amplifier 3 to enter operating state and the other to enter non-operating state, alternately. The first amplifier 4 is used for processing DVD-R, and the second amplifier 4 is used for processing DVD-RAM, for example. When processing DVD-RAM, an optical signal reading speed is higher, and optical signal intensity is smaller because reflected light from the optical disk is lower than when processing DVD-R. Accordingly, parameters of circuit elements are set so that the second amplifier 3 has a higher gain and a wider bandwidth than the first amplifier 4.

In the light receiver 31 of FIG. 3, the first amplifier 4 and the second amplifier 3 are connected to the photodiode 1. The amplifier in the non-operating state affects the amplifier in the operating state as a load of resistance and capacitance, which leads to an increase in noise to cause an optical signal reading error. Particularly, the second amplifier 3 has a high gain and is largely affected by the first amplifier 4 as a load, and an optical signal reading error is likely to occur during operation of the second amplifier 3. Related arts are described in Japanese Unexamined Patent Application Publication Nos. 2003-22537 and 2005-32282.

SUMMARY OF THE INVENTION

According to an aspect of the present invention, there is provided a light receiver including a photodiode converting an optical signal into an electrical signal and a plurality of amplifiers having each input end connected to one end of the photodiode, wherein at least one of the plurality of amplifiers and the photodiode are connected through a diode.

In this configuration, when the amplifier connected to the photodiode through the diode is in non-operating state, the diode is substantially zero-biased and in high-impedance state.

The present invention provides a light receiver with a wide bandwidth where a reading error does not occur, which is suitable for use in optical pickups with multi-compatibility.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Exemplary embodiments of the present invention are described hereinafter with reference to the drawings.

First Embodiment

Figure 1:
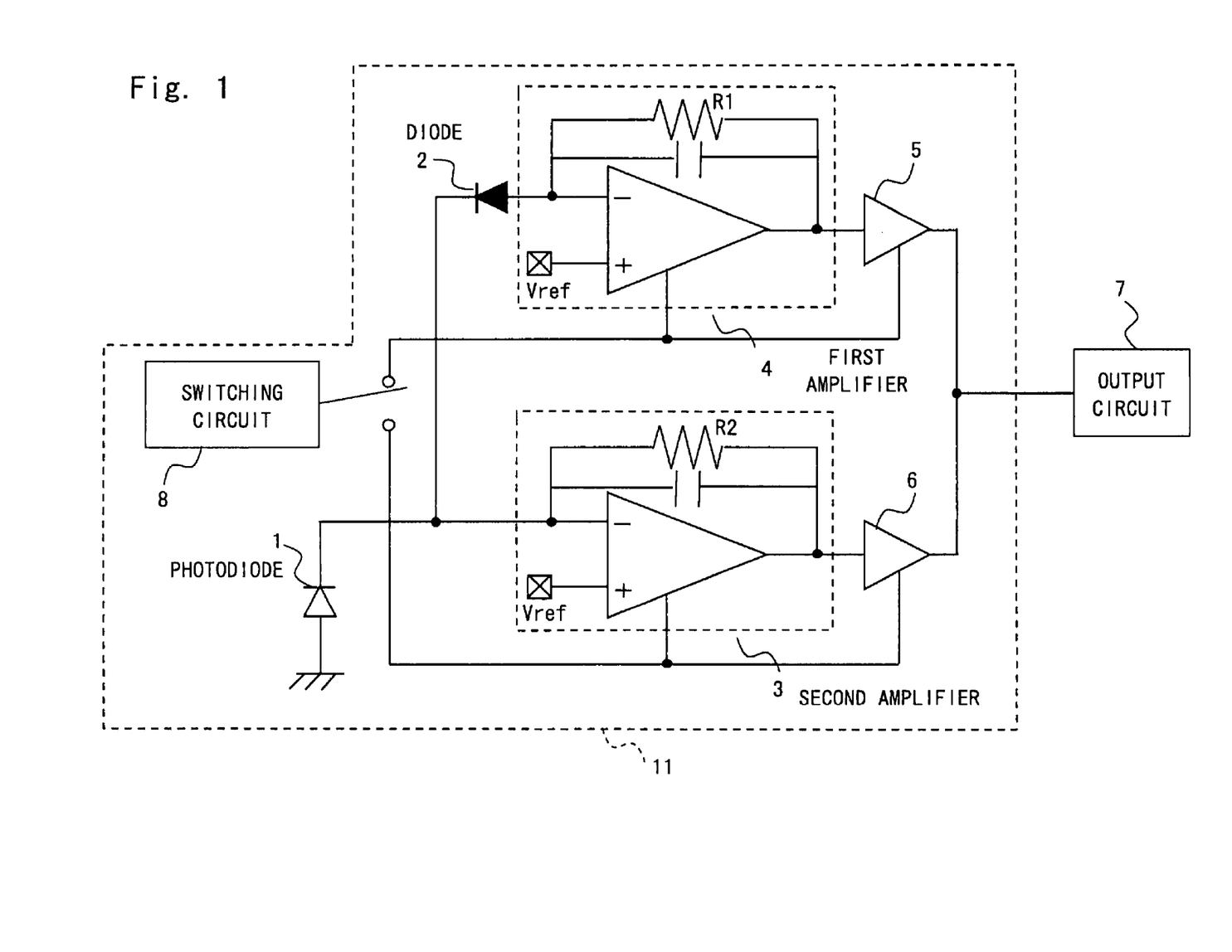
FIG. 1 is a circuit diagram showing the configuration of a light receiver according to a first embodiment of the invention.

Referring first to FIG. 1, in a light receiver 11 according to a first embodiment of the present invention, a cathode of a photodiode 1 which serves as an input signal source is connected to a cathode of a diode 2 and an input end of a second amplifier 3. An anode of the diode 2 is connected to an input end of a first amplifier 4. Output ends of the first amplifier 4 and the second amplifier 3 are connected to an input end of an output circuit 7 through buffers 5 and 6, respectively. The light receiver 11 also includes a switching circuit 8 which switches to cause one of the first amplifier 4 and the second amplifier 3 to enter operating state and the other to enter non-operating state, alternately.

The light receiver 11 may be integrated in one chip, thereby achieving the miniaturization of an optical pickup with multi-compatibility.

The first amplifier 4 is used for processing DVD-R, and the second amplifier 3 is used for processing DVD-RAM, for example. When processing DVD-RAM, an optical signal reading speed is higher, and optical signal intensity is smaller because reflected light from the optical disk is lower than when processing DVD-R. Accordingly, parameters of circuit elements are set so that the second amplifier 3 has a higher gain and a wider bandwidth than the first amplifier 4.

Figure 5:
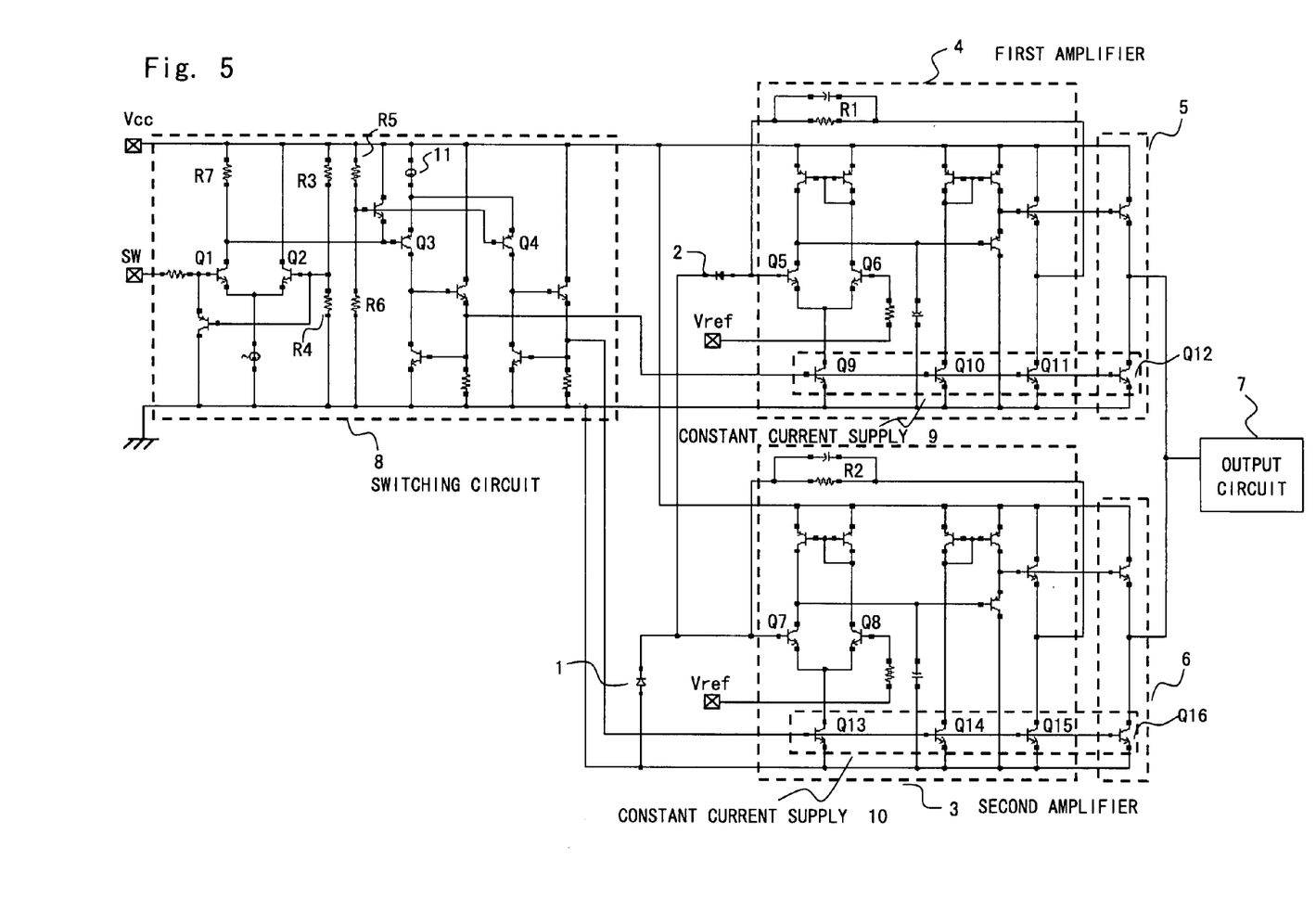
FIG. 5 is a circuit diagram showing a detail of a light receiver according to the first embodiment of the invention.

FIG. 5 is a circuit diagram to describe the circuit diagram of FIG. 1 in more detail.

A transistor as an element of the light receiver 11 may be a bipolar transistor. The first amplifier 4 and the second amplifier 3 have the same circuit configuration. Each input portion is a differential amplifier composed of an NPN transistor pair. Outputs are connected from the emitter follower of a PNP transistor to the emitter follower of an NPN transistor, and are then negative fed back to the input through the resistors R1 and R2, respectively. If output portions are directly connected with each other, the input/output of the amplifiers are common, the resistors R1 and R2 are parallel, which fails to perform switching operation. Thus, the buffers 5 and 6, each composed of an NPN transistor, are placed at the outputs of the first amplifier 4 and the second amplifier 3, respectively, so that each output of the first amplifier 4 and the second amplifier 3 is not connected to the output end of one another.

The switching circuit 8 includes a differential circuit composed of a transistor pair Q1 and Q2 and a differential circuit composed of a transistor pair Q3 and Q4. The output of Q3 and the output of Q4 are respectively connected to the differential amplifiers of the first amplifier 4 and the second amplifier 3, the emitter follower of the PNP transistor and the emitter follower of the NPN transistor, and constant current supplies 9 and 10 for supplying constant currents to the buffers 5 and 6. The light receiver 11 also has a switching terminal (SW) for receiving a switching signal from outside.

Although the first amplifier 4 and the second amplifier 3 have the same circuit configuration in this example, the circuit configuration is not necessarily the same as long as it includes a constant current supply and a buffer.

Referring now to FIG. 5, the operation of the light receiver 11 is described hereinafter.

The switching circuit 8, the first amplifier 4, and the second amplifier 3 receive a voltage Vcc from a power supply (not shown). In the switching circuit 8, the transistor Q2 operates if an input voltage to the switching terminal (SW) is lower than a voltage determined by the voltage between Vcc and the ground and the resistors R3 and R4, and the transistor Q1 operates if the input voltage is higher than the same. An output of the differential portion, which is a voltage at a node between R7 and the collector of the transistor Q1 is switched depending on the operation state (operating or non-operating) of the transistor Q1, and if the voltage is lower than a voltage determined by the voltage between Vcc and the ground and the resistors R5 and R6, the transistor Q3 operates and the current of the constant current source 11 flows only to the transistor Q3 side; if the voltage is higher than the same, the transistor Q4 operates and the current flows only to the transistor Q4 side. The selection of whether to flow a current to the bias line on the Q3 side to turn ON the constant current supply 9 or to flow a current to the bias line on the Q4 side to turn ON the constant current supply 10 is thereby made, thus switching between the operation and non-operation of the second amplifier 3.

The first amplifier 4 and the second amplifier 3 always receive a reference voltage Vref. A case where the first amplifier 4 is in the non-operating state and the second amplifier 3 is in the operating state is as follows. Because no current flows to the constant current supply 9 of the first amplifier 4, no current flows to the first amplifier 4. Consequently, no current flows to the diode 2, so that the diode 2 is substantially zero-biased and high-impedance. Although the first amplifier 4 serves as a load of resistance and capacitance even when it is in the non-operating state, the diode 2 and the first amplifier 4 are connected in series with respect to the photodiode 1, and the affect as a load is reduced by the diode 2 in the high-impedance state. The impedance value when the diode 2 is in the high-impedance state is set larger enough than the impedance when the first amplifier 4 serves as a load.

Figure 2:
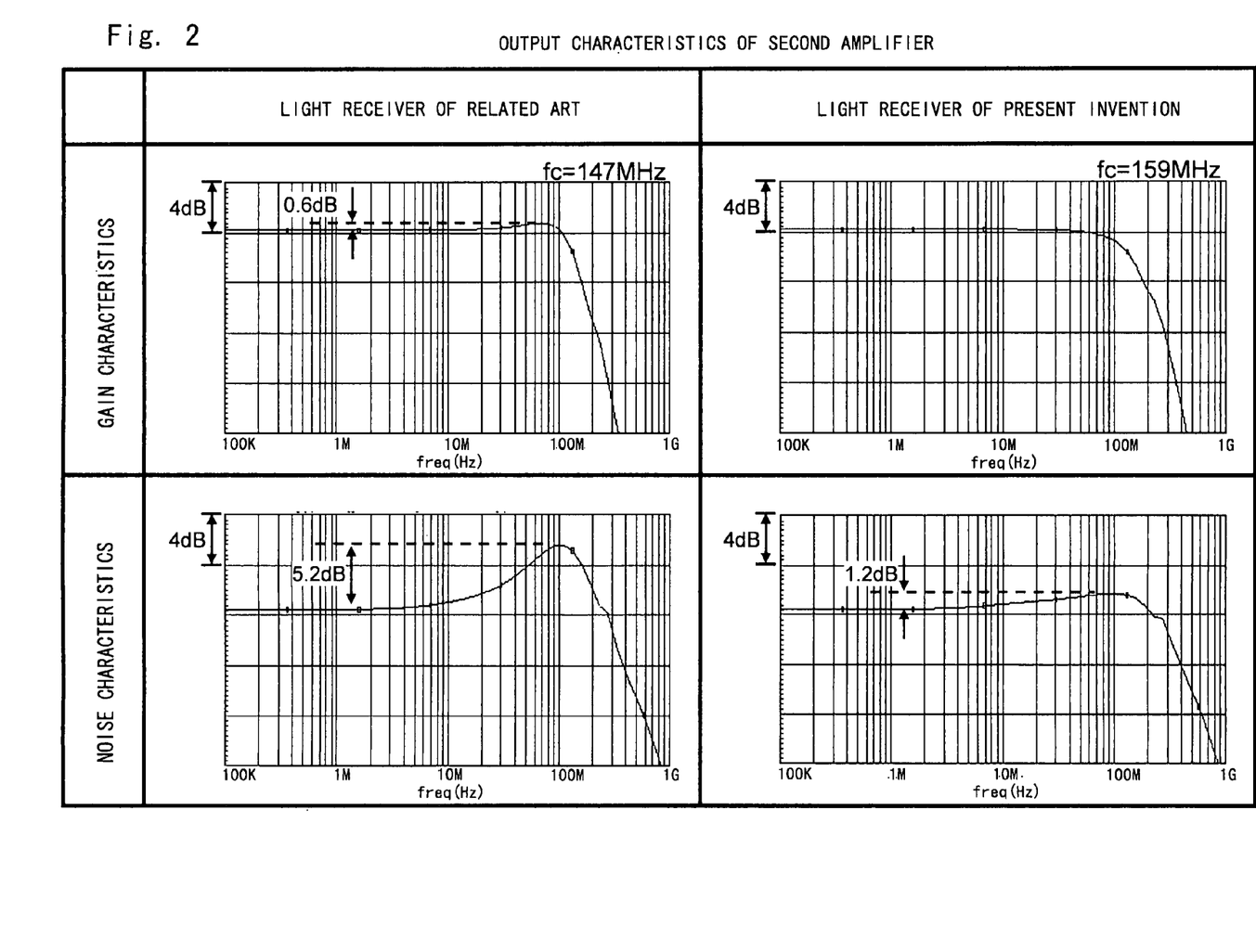
FIG. 2 is a view showing simulation results of output characteristics of a second amplifier according to the first embodiment of the invention.

FIG. 2 shows results of simulation of the output characteristics of the light receiver 11 to the output circuit 7 under the condition that the second amplifier 3 is in the operating state and the first amplifier 4 is in the non-operating state in comparison with the output characteristics of the light receiver 31 without the diode 2 under the same condition. The circuit configuration and the simulation conditions are the same except for the presence/absence of the diode 2.

The upper left column in FIG. 2 shows the frequency characteristics of output signal gain when the light receiver has no diode, the lower left column shows the frequency characteristics of noise when the light receiver has no diode, the upper right column shows the frequency characteristics of output signal gain when the light receiver has a diode, and the lower right column shows the frequency characteristics of noise when the light receiver has a diode.

When the light receiver has the diode 2, regarding the frequency characteristics of noise, a peak in the high-frequency area decreases from 5.2 dB to 1.2 dB compared with when it has no diode. The noise characteristics are thus significantly improved. Further, regarding the frequency characteristics of output signal gain, a peak in the high-frequency area decreases, and a cutoff frequency is also improved from 147 MHz to 150 MHz. This is because the diode 2 becomes high-impedance and the affect of the second amplifier 3 in the non-operating state as a load is eliminated. Since the intensity level of the noise is smaller than the output signal, the effect of peak improvement is more significant.

Figure 6:
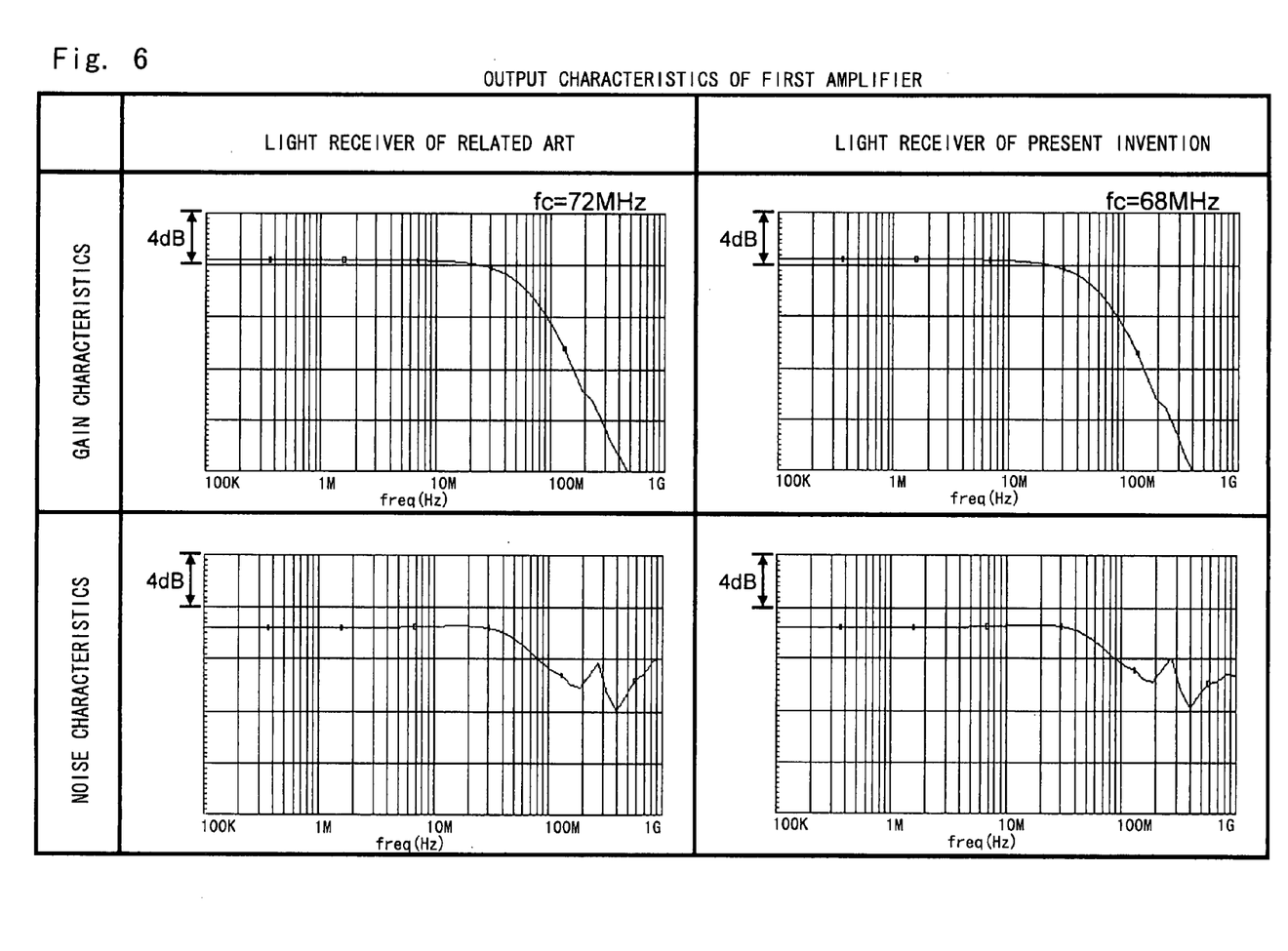
FIG. 6 is a view showing simulation results of output characteristics of a first amplifier according to the first embodiment of the invention.

FIG. 6 shows results of simulation of the output characteristics of the light receiver 11 to the output circuit 7 under the condition that the first amplifier 4 is in the operating state and the second amplifier 3 is in the non-operating state in comparison with the output characteristics of the light receiver 31 without the diode 2 under the same condition. The circuit configuration and the simulation conditions are the same regardless of the presence/absence of the diode.

The upper left column in FIG. 6 shows the frequency characteristics of output signal gain when the light receiver has no diode, the lower left column shows the frequency characteristics of noise when the light receiver has no diode, the upper right column shows the frequency characteristics of output signal gain when the light receiver has a diode, and the lower right column shows the frequency characteristics of noise when the light receiver has a diode. When the first amplifier 4 is in the operating state and the second amplifier 3 is in the non-operating state, a current flows to the constant current supply 9 and a current flows to the diode 2, so that the diode 2 is low-impedance. Accordingly, substantially the same characteristics as when the circuit does not have the diode 2 are maintained.

Second Embodiment

Figure 4:
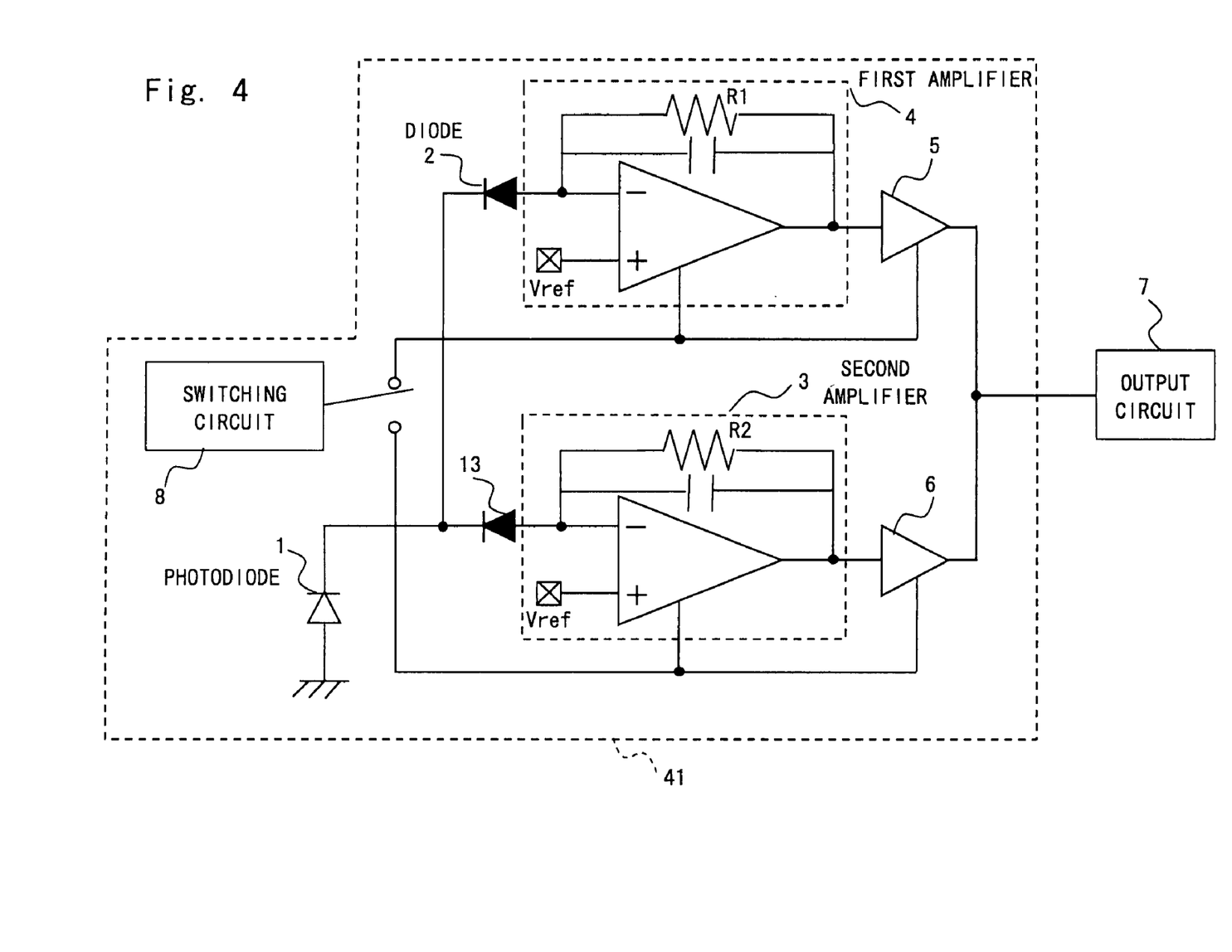
FIG. 4 is a circuit diagram showing the configuration of a light receiver according to a second embodiment of the invention.

A second embodiment describes a case where a diode is disposed for each amplifier. FIG. 4 is a circuit diagram of a light receiver 41 in such a case. A detailed circuit configuration is the same as shown in FIG. 5 except that the photodiode 1 and the second amplifier 3 are connected through a diode 13.

In this example, the first amplifier 4 is used for processing DVD-R, and the second amplifier 3 is used for processing BD-ROM. When processing BD-ROM, reflected light from the optical disk is still lower than when processing DVD-RAM, and the input optical signal intensity is smaller. Accordingly, it is necessary in this case to reduce the affect of the load of the amplifier in the non-operating state which causes an increase in noise during the operation of both amplifiers.

In this embodiment, low noise output can be obtained when either of the first amplifier 4 and the second amplifier 3 is in the operating state, enabling obtainment of suitable characteristics for the above usages.

Although the cathode of the photodiode is connected to the input of the amplifier in the first and second embodiments as described above, the present invention may be applied to the case of using an amplifier with inverted polarity and connecting to the anode of the photodiode. The connection of the diode is also inverted in such a case.

Further, the element connected between the photodiode and the amplifier is not necessarily the diode but may be an element with emitter-base short-circuit or base-collector short-circuit.

The present invention may be applied to a light receiver of an optical pickup which is used in a disk drive such as a personal computer, a DC/DVD/BD player, and so on.

It is apparent that the present invention is not limited to the above embodiment and it may be modified and changed without departing from the scope and spirit of the invention.

What is claimed is:

1. A light receiver comprising:
a photodiode converting an optical signal into an electrical signal;
a plurality of amplifiers respectively having different gains, each input end of the plurality of amplifiers receiving the electrical signal from one end of the photodiode, and at least one of the plurality of amplifiers being in an operating state for outputting an output signal while at least one of a remaining number of the plurality of amplifiers being in a non-operating state; and
a diode providing the electrical signal from the photodiode to one of the plurality of amplifiers,
wherein a terminal of a first polarity type of the photodiode is connected with a terminal of the first polarity type of the diode, and a second terminal of a second polarity type of the diode is connected with the input end of the one of the amplifiers, the first polarity type being opposite to that of the second polarity type, to thereby place the diode in a high-impedance state and be substantially zero biased when the one of the amplifiers is in the non-operating state.

2. The light receiver according to claim 1, wherein the plurality of amplifiers comprise two amplifiers, and an amplifier having less gain of the two amplifiers is connected to the photodiode through the diode.

3. The light receiver according to claim 1, further comprising:
a switching circuit for switching between an operating state and a non-operating state of amplifiers of the plurality of amplifiers; and
a buffer circuit for preventing a signal from being transmitted among output ends of the plurality of amplifiers,
wherein the switching circuit, the buffer circuit, the photodiode, the plurality of amplifiers, and the diode are integrated in one chip.

4. The light receiver according to claim 2, further comprising:
a switching circuit for switching between an operating state and a non-operating state of amplifiers of the plurality of amplifiers; and
a buffer circuit for preventing a signal from being transmitted among output ends of the plurality of amplifiers,
wherein the switching circuit, the buffer circuit, the photodiode, the plurality of amplifiers, and the diode are integrated in one chip.

5. The light receiver according to claim 1, further comprising a second diode connecting the input end of another one of the plurality of amplifiers with the one end of the photodiode.

6. The light receiver according to claim 5, wherein the terminal of the first polarity type of the photodiode is connected with a terminal of the first polarity type of the second diode, and a second terminal of the second polarity type of the second diode is connected with the input end of the one of the amplifiers.

7. The light receiver according to claim 1, wherein the one of the plurality of amplifiers and the photodiode are directly connected through the diode.

8. The light receiver according to claim 1, wherein the diode is directly connected to only the one of the plurality of amplifiers.

9. The light receiver according to claim 1, wherein the diode and the one of the plurality of amplifiers are connected in series with respect to the photodiode.

10. The light receiver according to claim 1, wherein each amplifier of the plurality of amplifiers, comprises:
a differential amplifier receiving an input signal from the photodiode and including a unit for constant current supply; and
a buffer connected to an output of the differential amplifier and other buffers of the plurality of amplifiers.

11. A light receiver comprising:
a first unit for converting an optical signal into an electrical signal;
a second unit selectively amplifying the electrical signal from the first unit;
a third unit amplifying the electrical signal from the first unit, the second unit having a gain different from a gain of the third unit, an input end of the second and third units receiving the electrical signal from the first unit, and one of the second unit and the third unit being selectively in an operating state for outputting an output signal and the other one of the second unit and the third unit being in a non-operating state; and
a fourth unit providing the electrical signal from the first unit to the second unit, the fourth unit comprising a first terminal connected to a first semiconductor region of a first conductivity type and a second terminal connected to a second semiconductor region of a second conductivity type adjacent to the first semiconductor region, the second conductivity type being opposite to that of the first conductivity type, wherein a terminal of a first conductivity type of the first unit, providing the electrical signal, is connected with the first terminal of the first conductivity type of the fourth unit, and the second terminal of the second conductivity type of the fourth unit is connected with the input end of the second unit, to thereby place the fourth unit in a high-impedance state and be substantially zero biased when the second unit is in the non-operating state to prevent current from the first unit flowing into the second unit.

12. The light receiver of claim 11, further comprising a fifth unit connecting the input end of the third unit with the terminal of the first conductivity type of the first unit, the fifth unit comprising a first terminal connected to a first semiconductor region of a first conductivity type and a second terminal connected to a second semiconductor region of a second conductivity type adjacent to the first semiconductor region.

13. The light receiver of claim 12, wherein the second terminal of the fifth unit connects to the input end of the third unit, and the first terminal of the first conductivity type of the fifth unit is connected to the terminal of the first conductivity type of the first unit providing the electrical signal.

14. The light receiver of claim 11, wherein a gain of the second unit is less than a gain of the third unit.

15. The light receiver of claim 11, wherein each of the second and third units, comprises:
   a differential amplifier receiving an input signal from the first unit, and including a sixth unit for providing a constant current supply; and
   a buffer coupled to an output of the differential amplifier and a buffer of the second unit or the third unit.

16. The light receiver according to claim 11, wherein the fourth unit and the second unit are connected in series with respect to the first unit.

17. A method of light signal conversion, the method comprising:
   converting by a first unit, an optical signal into an electrical signal;
   selectively amplifying, by a second unit, the electrical signal from the first unit;
   selectively amplifying by a third unit, the electrical signal from the first unit, the third unit including a gain different from a gain of the second unit, input ends of the second and third units receiving the electrical signal from the first unit, and one of the second unit and the third unit being selectively in an operating state for outputting an output signal and the other one of the second unit and the third unit being in a non-operating state; and
   reducing by a fourth unit, a load of the third unit when the third unit is selected in a non-operating state, the fourth unit including at least a first and a second terminal connected on opposite sides of a p-n junction, the first terminal of the fourth unit connecting the input end of the second unit, and the second terminal of the fourth unit being connected to one end of the first unit providing the electrical signal, to thereby place the fourth unit in a high-impedance state and be substantially zero biased when the third unit is in the non-operating state to limit an effect as load by the third unit.

18. The method of claim 17, wherein the reducing the load of the third unit comprises increasing an impedance of the fourth unit with the third unit.

19. The light receiver according to claim 5, wherein the terminal of the first polarity type of the photodiode is connected with a terminal of the first polarity type of the second diode.

20. The light receiver according to claim 1, wherein the diode is connected in series with the photodiode and the one of the amplifiers in the non-operating state to stop a current flow from the photodiode to the one of the amplifiers in the non-operating state.

21. The light receiver according to claim 1, wherein the diode in the high-impedance state affects the one of the amplifiers in the non-operating state to serve as a load of a resistance and a capacitance.

22. The light receiver according to claim 1, wherein the plurality of amplifiers always receive a reference voltage whether in the operational or non-operational state.

* * * * *